(12) United States Patent
Brunton et al.

(10) Patent No.: US 12,312,278 B2
(45) Date of Patent: May 27, 2025

(54) METHODS OF REDUCING FIBER CEMENT WASTE AND FIBER CEMENT ARTICLES PRODUCED THEREFROM

(71) Applicant: James Hardie Technology Limited, Dublin (IE)

(72) Inventors: Greg Brunton, Sydney (AU); Peter Pagones, Sydney (AU); Sagarika Richards, Sydney (AU)

(73) Assignee: James Hardie Technology Limited, Dublin (IE)

( * ) Notice: Subject to any disclaimer, the term of this patent is extended or adjusted under 35 U.S.C. 154(b) by 509 days.

(21) Appl. No.: 17/596,995

(22) PCT Filed: Jul. 16, 2020

(86) PCT No.: PCT/EP2020/070235
§ 371 (c)(1),
(2) Date: Dec. 22, 2021

(87) PCT Pub. No.: WO2021/009330
PCT Pub. Date: Jan. 21, 2021

(65) Prior Publication Data
US 2022/0298081 A1 Sep. 22, 2022

Related U.S. Application Data

(60) Provisional application No. 62/874,847, filed on Jul. 16, 2019.

(51) Int. Cl.
*C04B 41/45* (2006.01)
*C09J 5/06* (2006.01)
(Continued)

(52) U.S. Cl.
CPC ............ *C04B 41/4584* (2013.01); *C09J 5/06* (2013.01); *E04F 13/14* (2013.01);
(Continued)

(58) Field of Classification Search
CPC .. C04B 41/4584; C04B 2111/60; E04F 13/14; E04F 15/02183; E04F 15/08
(Continued)

(56) References Cited

U.S. PATENT DOCUMENTS

| | | | |
|---|---|---|---|
| 10,787,819 B2 * | 9/2020 | Diercks | ............... E04F 13/0871 |
| 2009/0007517 A1 | 1/2009 | Swanson | |
| 2016/0060878 A1 | 3/2016 | Everhart et al. | |

FOREIGN PATENT DOCUMENTS

| | | |
|---|---|---|
| DE | 20 2014 005148 U1 | 7/2014 |
| EP | 3 450 646 A1 | 3/2019 |
| WO | WO 2018/138266 A1 | 8/2018 |

OTHER PUBLICATIONS

International Search Report and Written Opinion mailed Dec. 23, 2020 in International Application No. PCT/EP2020/070235, in 17 pages.

* cited by examiner

*Primary Examiner* — James D Sells
(74) *Attorney, Agent, or Firm* — Knobbe, Martens, Olson & Bear LLP

(57) ABSTRACT

A composite fibre cement cladding element, comprising a plurality of fibre cement component pieces is provided wherein the fibre cement component pieces are fused together to provide a single unit that gives the appearance of two or more courses of cladding elements in a series.

20 Claims, 16 Drawing Sheets

(51) Int. Cl.
*E04F 13/14* (2006.01)
*E04F 15/02* (2006.01)
*E04F 15/08* (2006.01)
*C04B 111/60* (2006.01)

(52) U.S. Cl.
CPC ........ *E04F 15/02183* (2013.01); *E04F 15/08* (2013.01); *C04B 2111/60* (2013.01)

(58) Field of Classification Search
USPC ........................................................ 156/256
See application file for complete search history.

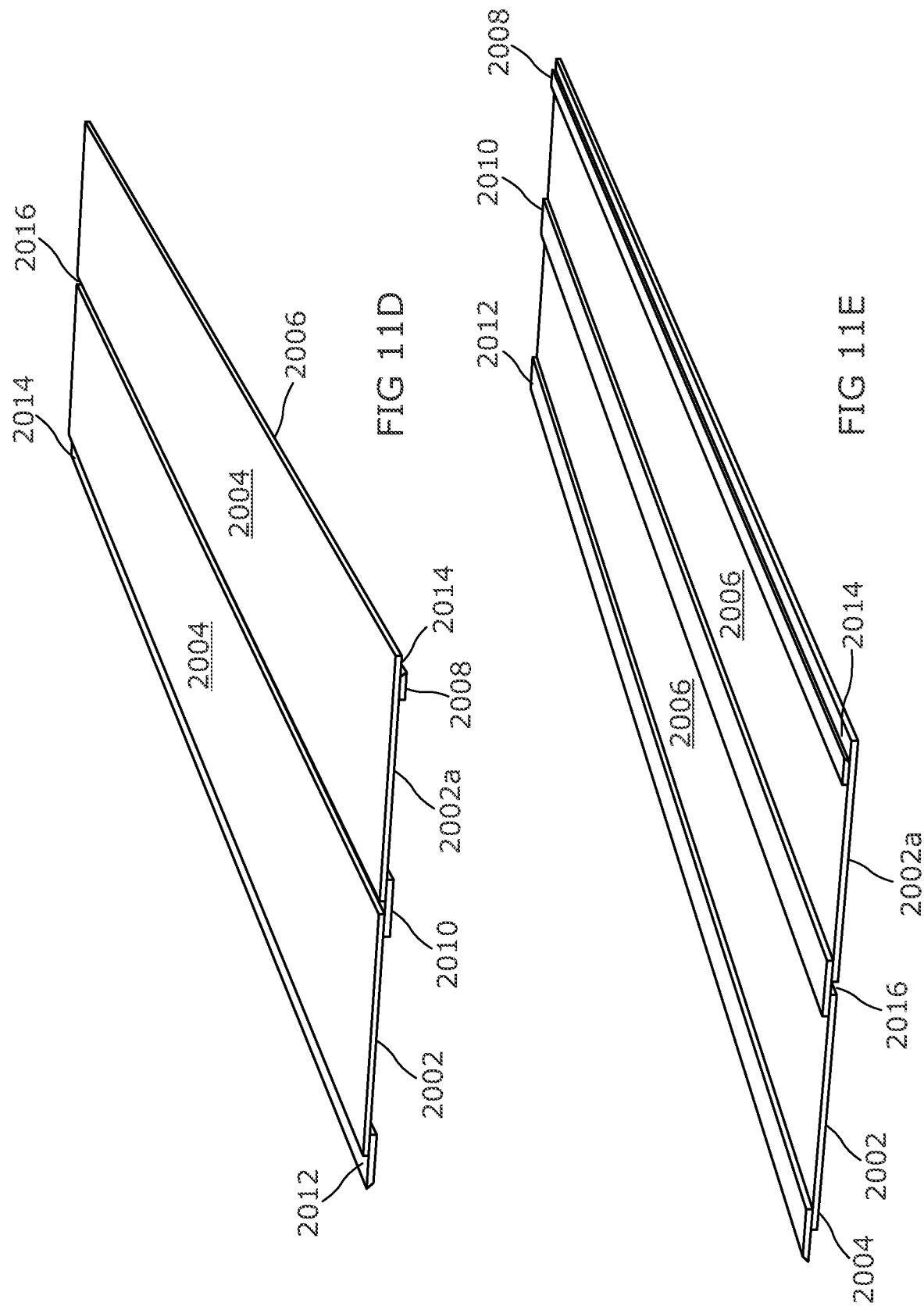

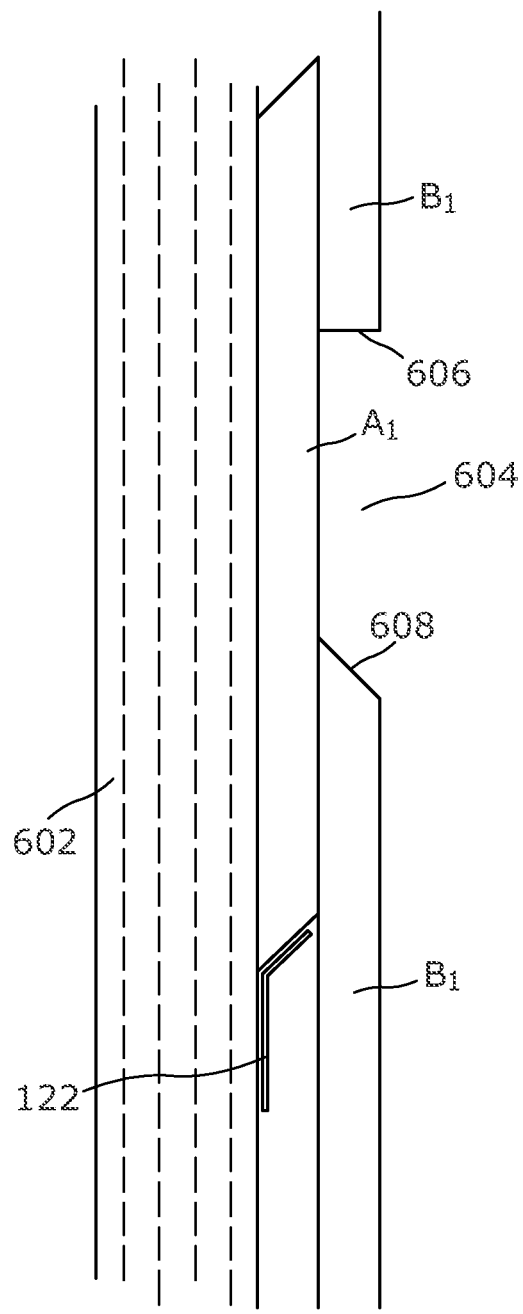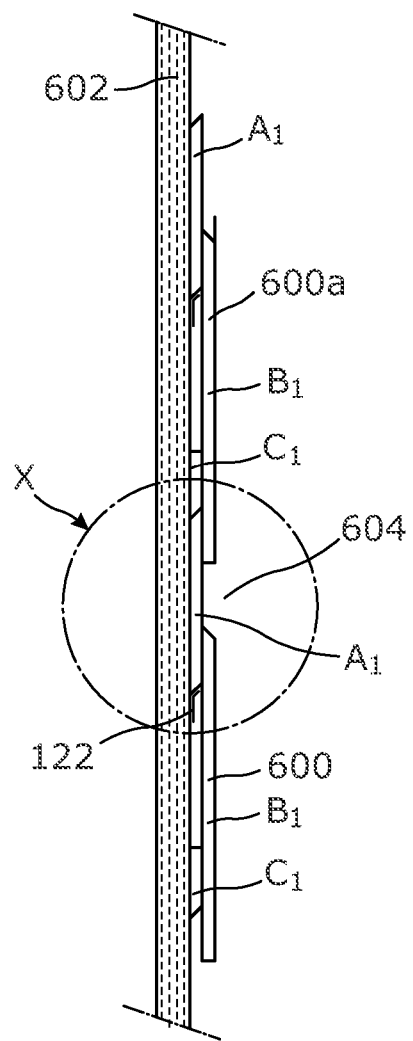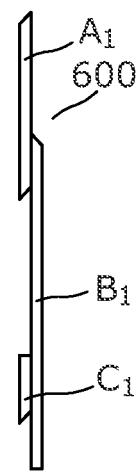
FIG 12A
FIG 12B
FIG 12C

METHODS OF REDUCING FIBER CEMENT WASTE AND FIBER CEMENT ARTICLES PRODUCED THEREFROM

CROSS-REFERENCE TO RELATED APPLICATIONS

This application is the U.S. National Phase of PCT/EP2020/070235, filed Jul. 16, 2020 entitled 'Methods of Reducing Fiber Cement Waste and Fiber Cement Articles Produced therefrom', which claims the benefit of U.S. Provisional Application Ser. No. 62/874,847, filed Jul. 16, 2019 entitled 'Methods of Reducing Fiber Cement Waste and Fiber Cement Articles Produced therefrom', which is hereby incorporated by reference in its entirety and for all purposes.

FIELD

The present disclosure generally relates to cladding elements suitable for use in building construction, in particular, to the manufacture of said cladding elements.

The embodiments disclosed herein have been developed primarily for use as cladding elements and will be described hereinafter with reference to this application. However, it will be appreciated that the embodiments are not limited to this particular field of use and that the embodiments can be used in any suitable field of use known to the person skilled in the art.

BACKGROUND

Any discussion of the prior art throughout the specification should in no way be considered as an admission that such prior art is widely known of forms part of the common general knowledge in the field.

Interior and exterior cladding elements, such as, for example exterior cladding articles, interior cladding articles, sidings, soffit panels, backer boards, flooring materials and the like, are typically used to protect and/or improve the aesthetic qualities of building walls, wet areas and flooring. Such cladding elements come in many forms including fibre cement cladding elements.

Fibre cement cladding elements are typically manufactured by producing a thick rectangular piece of fibre cement material, followed by cutting and/or machining the material into a desired net shape. Cutting and/or machining fibre cement to produce the desired profile often result in some portions of the fibre cement material being discarded as waste.

SUMMARY OF THE INVENTION

Generally described, the present disclosure provides for cladding elements that comprises a plurality of sectional fibre cement pieces that are fused together to form a composite fibre cement cladding article.

According to the present disclosure there is provided a method of manufacturing a cladding element as set out in the appended claims.

For the purposes of this specification, the term 'comprise' shall have an inclusive meaning. Thus, it is understood that it should be taken to mean an inclusion of not only the listed components it directly references, but also non specified components. Accordingly, the term 'comprise' is to be attributable with as broad an interpretation as possible and this rationale should also be used when the terms 'comprised' and/or 'comprising' are used.

BRIEF DESCRIPTION OF THE DRAWINGS

The embodiments will now be described more particularly with reference to the accompanying drawings, which show by way of example only cladding elements of the disclosure.

FIG. 11D is top perspective view of the cladding article of FIG. 11B;

FIG. 11E is a bottom perspective view of the cladding article to FIG. 11B;

FIG. 12A is an enlarged side sectional view of detail X of the cladding article of FIG. 12B;

FIG. 12B is a side sectional view of a plurality of the cladding article of FIG. 12C in mounted configuration;

FIG. 12C is a side view of a further example of a cladding article of the present disclosure having an external appearance similar to the cladding articles of FIG. 4;

DETAILED DESCRIPTION OF THE PREFERRED EMBODIMENTS

Figure 1A:
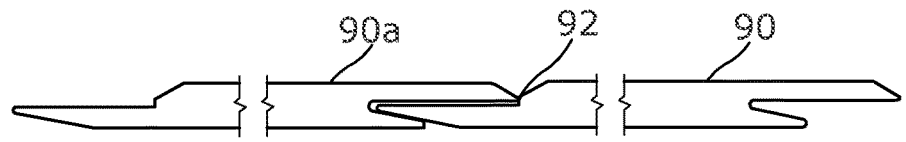
FIGS. 1A-1F depict several example profiles of cladding elements.

Although making and using various embodiments are discussed in detail below, it should be appreciated that the embodiments described provide inventive concepts that may be embodied in a variety of contexts. The embodiments discussed herein are merely illustrative of ways to make and use the disclosed articles, systems and methods and do not limit the scope of the disclosure.

In the description which follows, like parts may be marked throughout the specification and drawings with the same reference numerals. The drawing figures are not necessarily to scale and certain features may be shown exaggerated in scale or in somewhat generalized or schematic form in the interest of clarity and conciseness.

Typically, fibre cement cladding elements are installed on a structural support such that there is an overlap between consecutive cladding elements, whereby the primary visible external surfaces of consecutive cladding elements are parallel but not coplanar achieving a lap-siding cladding aesthetic or such that there is no overlap between consecutive cladding elements, whereby the primary visible external surfaces of consecutive cladding elements are parallel and coplanar achieving a flat wall cladding aesthetic. In either installation method, the cladding articles have varying thicknesses. The thickness and configuration of the cladding elements enable a cladding system using said cladding elements and standard nailing methods to achieve a desired wind load requirement.

One advantage of the present disclosure is that it is possible to provide a composite fibre cement cladding article that is as thin as or thinner than fibre cement cladding articles typically used in such cladding installations. In addition, it is also possible to provide a single unit composite fibre cement cladding article that is configured to resemble one or more cladding articles in series. Such single unit composite fibre cement cladding articles can provide differing interface aesthetics on their front face to give the appearance of two or more courses of cladding elements in series as will be described in more detail below. It is generally easier for an end user to handle and quicker for an end user to install the composite fibre cement cladding article of the present disclosure.

Referring now to the drawings, FIGS. 1A to 1E depict several example profiles of cladding articles, in particular the profiles of fibre cement cladding articles. The example profiles provide a number of differing options for aesthetics at the interface between two adjacent cladding elements 90, 90a; 100, 100a; 200, 200a; 300, 300a; and 400, 400a in a series in a flat wall cladding aesthetic.

Figure 1B:
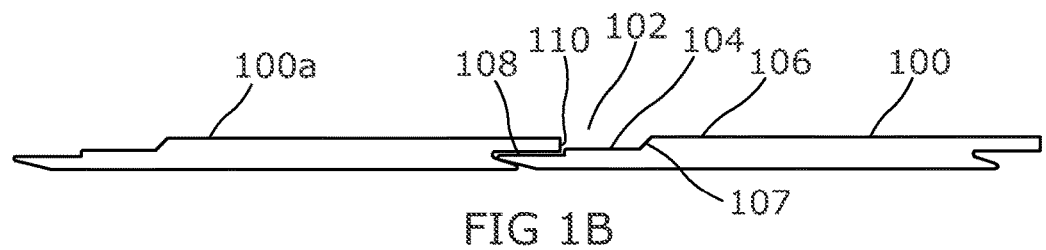
Figure 1C:
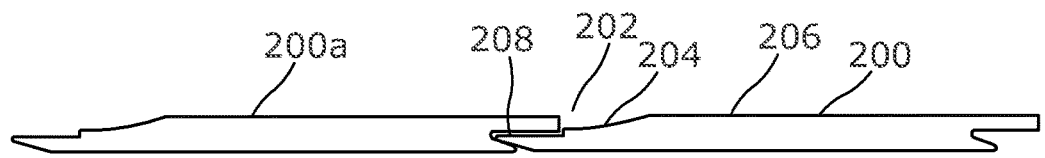
Figure 1D:
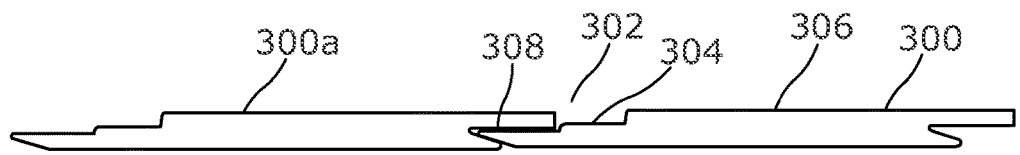
Figure 1E:
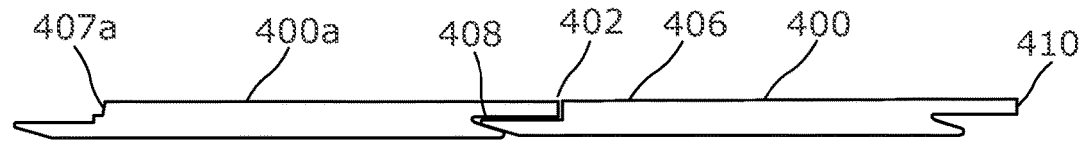

The interface between two adjacent cladding elements 90, 90a; 100, 100a; 200, 200a; 300, 300a; and 400, 400a are commonly profiled to have either a 'v' groove channel 92, as shown in FIG. 1A or a square channel or a rabbet profile 402, as shown in FIG. 1E. The square channel or rabbet profile was developed by the wood industry and is more commonly referred to as ship-lap. The ship-lap profile generally appears as a step shaped recess or rebate between the two adjacent cladding elements.

In some embodiments, the cladding element 100, 100a; 200, 200a; and 300, 300a further comprise a transition portion 104, 204, 304 between a first surface 106, 206, 306 and the front recessed surface 108, 208, 308. The transition portion 204 can have a concave shape. Such a configuration is sometimes referred to as cove shiplap 202. Additionally, a square channel configuration can be utilized, wherein a transition portion 104, 304 of the cladding element 100, 300 is substantially planar and substantially perpendicular to one or both of the front recessed surface 108, 308 and the first surface 106, 306.

With specific reference to FIG. 18 it is shown that the transition portion 104 of a first cladding element 100 enables first profiled side edge 107 to be spaced from second profiled side edge 110 of a second cladding element 100a when the second cladding element 100a is mated with the first cladding element 100. The transition portion 204 and 304 achieve the same effect in profiles 200 and 300. In contrast, the cladding elements 400, 400a of FIG. 1E do not have a transition portion, nonetheless first cladding element 400 is spaced from second profiled side edge 410 of a second cladding element 400a when the second profiled side edge (for clarity the feature is indicated on the first cladding element 400 as feature 410) of the second cladding element 400a is mated with the first profiled side edge (for clarity the feature is indicated on the second cladding element 400a as feature 407a) of the first cladding element 400. Although not shown, in some cases, a cladding element can also have a wide cove configuration wherein the concave transition portion of a first cladding element is spaced from second profiled side edge of a second cladding element when the second profiled side edge of the second cladding element is mated with the first profiled side edge of the first cladding element.

In some embodiments, a cladding element can also include one or more channel features in the first surface of the cladding element. The channel features can have the same shape (e.g., V groove, cove, wide cove, square channel, etc.) as the shapes of the grooves formed between mated cladding elements.

Figure 1F:
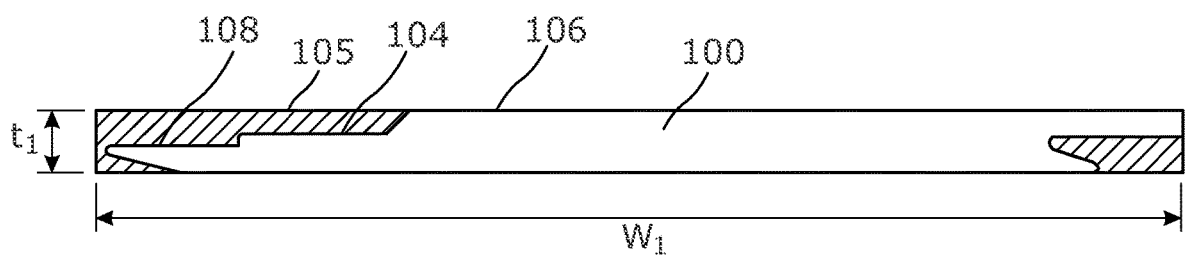

Referring now to FIG. 1F, existing manufacturing methods for fibre cement cladding articles typically involve producing a single (e.g., monolithic) piece of material at least as thick as the full thickness $t_1$ of the article and at least as wide $W_1$ as the full width of the article. This can be referred to as a product blank 105 for the fibre cement cladding article. The single piece of material (i.e. product blank 105) may then be formed into a desired profile shape (e.g., the net shape of the article 100) by removing some of the material, such as by cutting, grinding, machining, or other subtractive manufacturing techniques. Such manufacturing methods may be relatively inefficient. For example, some or all of the material removed by the subtractive manufacturing techniques may be waste material that cannot be recycled or reused for manufacturing additional articles. Efficiency may be improved by reducing the amount of material that must be removed from the product blank to produce the net shape.

FIGS. 2A-2E schematically illustrate example additive manufacturing processes for manufacturing product blanks for the example profiles of FIGS. 1A to 1E. As will be described in greater detail, the example processes of FIGS. 2A-2E include the production of a plurality of thinner component pieces or component sheets or layers, which can be bonded, fused, or otherwise joined to produce product blanks that are relatively closer to the final net shape of a cladding article than a simple rectangular product blank. Hereinafter, the terms component pieces, component sheets, component layers, panels, or layer shapes are used interchangeably to describe the component parts of the composite cladding articles or elements of the present disclosure.

Figure 2A:
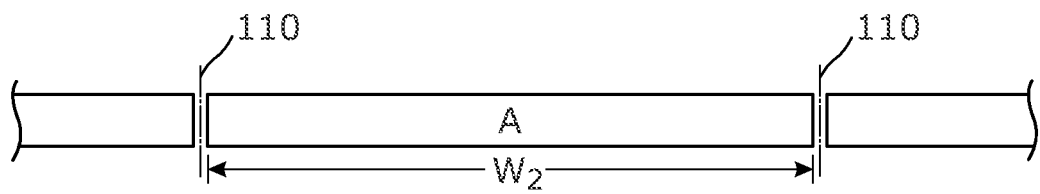
FIGS. 2A-2E schematically illustrate example additive manufacturing processes for manufacturing product blanks for the example profiles of FIGS. 1A-1F.
Figure 2B:
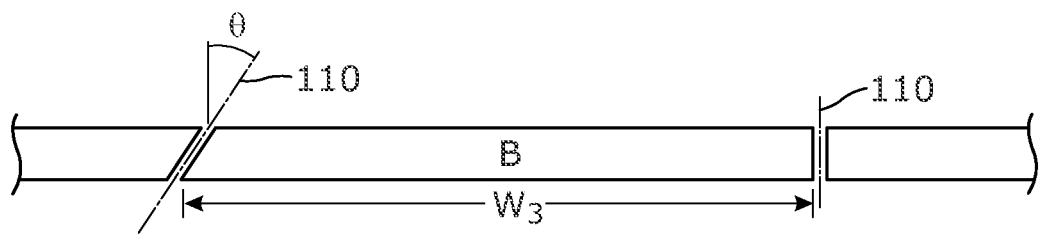
Figure 2C:
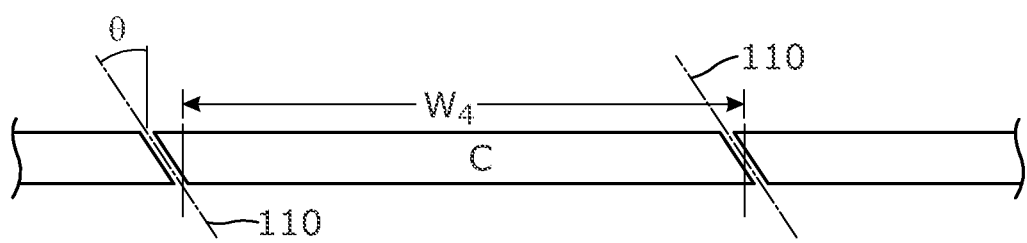
Figure 2D:
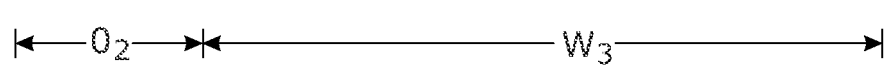
Figure 2E:

Three example layer shapes are illustrated in FIGS. 2A-2C. In this particular example manufacturing process, each of the sheets illustrated in FIGS. 2A-2C are manufactured in a thickness equal to approximately half of the full thickness of the finished cladding articles to be produced (e.g., the cladding articles illustrated in FIGS. 1A to 1E). The thickness of the sheets exemplified in FIGS. 2A-2C are approximately 7 mm thick which when fused together form as shown in FIG. 2D and 2E are form a finished cladding article blank that is approximately 14 mm in thickness. Each component panel or plank (e.g., panels A, B, and C) may be produced by first creating a sheet of fibre cement or other material (e.g., by the Hatschek process or another suitable manufacturing process), followed by cutting the panels or planks out of the sheets along a cutting axis 110. The cutting axis 110 may be vertical or may be disposed at an angle θ relative to vertical. Panels or planks may be cut out of sheets by any known cutting method, such as by sawing, water jet cutting, or the like.

In some embodiments, panel A as illustrated in FIG. 2A is a square-edged panel of width $W_2$ suitable to form the top or outer layer of a finished cladding article or product blank. Panel B as illustrated in FIG. 2B may be a single angled panel of width $W_3$ which is suitable to form the top or outer layer of a finished cladding article or product blank. Panel C as illustrated in FIG. 2C may be a double angled panel of width $W_4$ suitable to form the lower or back layer of a finished cladding article or product blank.

FIG. 2D illustrates an example product blank comprising a square-edged panel A of FIG. 2A and a double angled panel C of FIG. 2C, joined by a fusion layer 115. In the embodiment shown square-edged panel A forms the top layer of the product blank whilst double angled panel C forms the bottom layer of the product blank. Square-edged top panel A is fused to bottom double angled panel C along their respective widths such that width $W_2$ of square-edged top panel A is offset from width $W_4$ of bottom double angled panel C by a distance $O_1$ and $O_2$ respectively.

Similarly, FIG. 2E illustrates an example product blank comprising an angled panel B of FIG. 2B and a double angled panel C of FIG. 2C, joined by a fusion layer 115. As before angled panel B forms the top layer of the product blank whilst double angled panel C forms the bottom layer of the product blank. Angled top panel B is also fused to bottom double angled panel C along their respective widths such that width $W_3$ of top panel B is offset from width $W4$ of bottom double angled panel C by a distance $O_3$ and $O_4$ respectively.

Fusion or bonding of adjacent panels may be achieved by a variety of chemical and/or mechanical methods at various stages in the production of the product blanks. In some embodiments, adjacent panels are fused before any pre-curing or curing operations. For example, after forming and cutting the individual panels A, B, C in a Hatschek or other fibre cement forming process, the panels making up each individual product blank may be placed together and offset as shown in FIGS. 2D and 2E, and joined by pressure such as in a press or other compressing apparatus to cause the adjacent panels to fuse together. In this example, the fusion layer 115 corresponds to a thin compressed or mixed layer at the interface between the adjacent panels. In some cases, the joined product blanks may be supported on support structures and/or may be nested together with other joined product blanks to prevent sagging of the overhanging layers during pre-curing and/or curing operations.

In some embodiments, adjacent panels are fused together by one or more actions performed during a pre-curing operation. In one example, a thin piece or layer of a plastic sheet, mesh, or other structure, may be placed between the adjacent panels during or following pre-curing. The plastic may be a polymeric material, for example, polyethylene or any other plastic material having a relatively low melting point (e.g., a melting point less than or equal to a temperature used during curing of the product blanks). When the assembled and offset product blanks are subsequently cured at an elevated temperature, the plastic layer melts and bonds the adjacent panels when the cured panels cool. In this example, the fusion layer 115 corresponds to the cooled layer of polymeric material bonding the adjacent panels.

In another example of fusing adjacent panels during pre-curing, the adjacent panels may be bonded by application of a viscous liquid or slurry material configured to bond to the panel material. For example, in the case of fibre cement articles, the bonding material may be a cement-based slurry, such as a slurry of cement and siliceous material (e.g., silica or other material). The slurry may then be cured by the same curing process applied to the panels. In this example, the fusion layer 115 corresponds to the cured slurry material applied between the adjacent panels.

In some embodiments, adjacent panels are fused together by one or more actions performed after curing of the panels. For example, the panels (such as panels A, B, and/or C) may be cut out of respective sheets, pre-cured, and cured to produce fibre cement panels, and may subsequently be bonded in the offset configurations of FIGS. 2D and 2E, such as by a glue or other adhesive that bonds to the finished product blank material. In this example, the fusion layer 115 corresponds to the adhesive material bonding the adjacent panels together.

In one embodiment, when the fusion layer 115 is an adhesive material, the thickness of the adhesive material is between 0.05 mm and 0.15 mm. In one embodiment, the thickness of the adhesive material is approximately 0.1 mm.

In one example when the fusion layer 115 comprises an adhesive material, it is desirable for the surface area coverage of the adhesive material to be approximately 40% or greater of the surface area to be bonded. For example, in FIGS. 2D and 2E, fusion layer 115 covers approximately 40% or greater of the overlap area between the top layer, square-edged panel A or angled panel B; and the bottom layer, double angled panel C. In one embodiment, the adhesive material is suitable for use in load bearing structures. In one embodiment the adhesive material is selected from the Polyurethane family of adhesives. In a further embodiment, the adhesive material is a modified silyl polymer (MSP) adhesive. The adhesive material may further comprise fibre reinforcing materials. In one embodiment, the adhesive material is a one-component, moisture curing PUR fibre reinforced adhesive material. In one example, the adhesive material is a one-component fibre-reinforced adhesive material pre-polymer, such as, for example, Jowat Adhesives product, Jowapur® 1K 681.10. The advantage of such an adhesive material is that it is colourless which facilitates visually discreet glue lines.

FIGS. 3A-3D schematically illustrate example additive manufacturing processes for manufacturing product blanks for cladding articles having an external appearance similar to the articles of FIGS. 1A and 1B. As will be described in greater detail, the manufacturing processes of FIGS. 3A-3D may further reduce the amount of material required to produce the finished cladding articles and may further be advantageous by reducing the weight of the finished cladding articles.

Figure 3A:
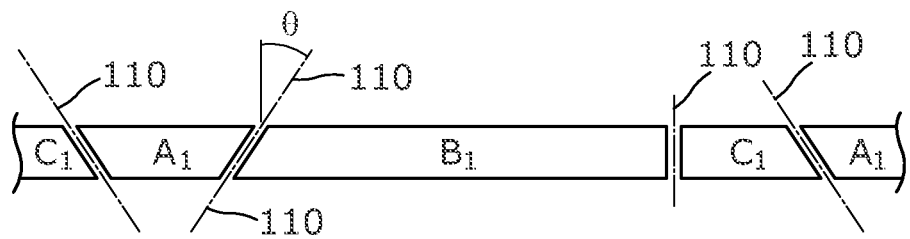
FIGS. 3A-3D schematically illustrate example additive manufacturing processes for manufacturing product blanks for cladding articles having an external appearance similar to the cladding articles of FIGS. 1A-1F.
Figure 3B:
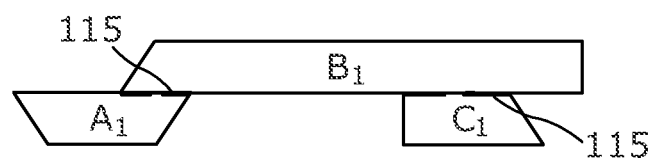
Figure 3C:
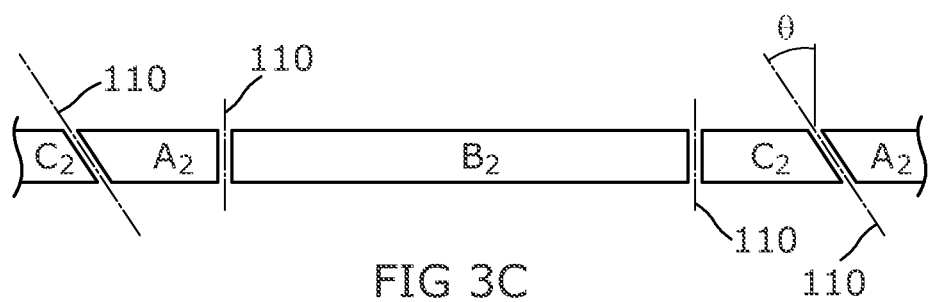
Figure 3D:
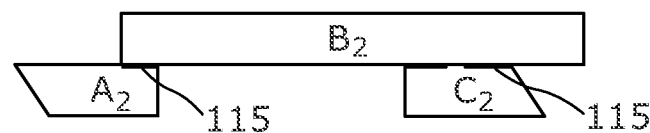

FIG. 3A illustrates an example set of panels $A_1$, $B_1$, and $C_1$ that may be cut as previously described from one or more layers of material, such as fibre cement, to produce the angled product blank shown in FIG. 3B. Similarly, FIG. 3C illustrates an example set of panels $A_2$, $B_2$, and $C_2$ that may be cut from one or more layers of material, such as fibre cement, to produce the square-edged product blank shown in FIG. 3D. As described previously, each individual product blank is fused together as shown in FIGS. 3B and 3D. The product blanks of FIGS. 3B and 3D differ from those of FIGS. 2D and 2E, in that the lower or back layer of each product blank comprises two smaller panels $A_1$, $A_2$, $C_1$ and $C_2$ in a spaced configuration, rather than a full single panel spanning the full width of the lower or back layer. Panels $A_1$, $A_2$, $C_1$ and $C_2$ are offset from the upper or top layer of $B_1$ and $B_2$ of each product blank.

The product blanks of FIGS. 3B and 3D can be used as cladding elements. Such cladding elements can be assembled to produce cladding systems (e.g., wall portions). These cladding systems can be installed on an exterior or interior surface of a wall and can be used to provide aesthetic improvement, improved weather resistance, improved thermal efficiency, improved structural stability, and/or many other improvements to an existing wall. For example, the cladding systems disclosed herein can be installed on substructure such as a wooden frame or any other suitable wall structure which could be an interior or exterior wall structure.

Figure 4:
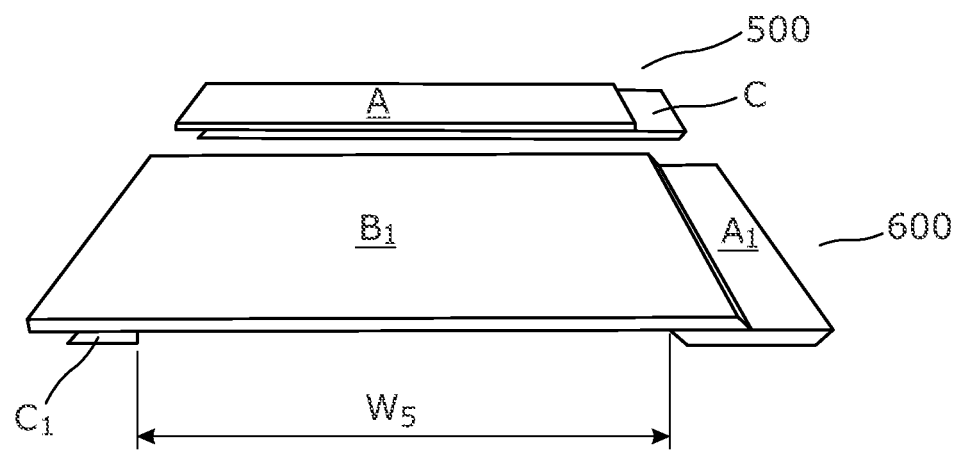
FIG. 4 depicts exemplary cladding articles produced by the process of FIGS. 2A-2C and FIGS. 3A and 3B respectively.

FIG. 4 is an example of a composite fibre cement cladding article 500 produced by the processes of FIGS. 3A-3D (foreground) and an example of a composite fibre cement cladding article 600 produced by the processes of FIGS. 2A-2D (background) respectively. The advantage of both composite fibre cement cladding articles is that each layer A, $A_1$, $B_1$ and C is typically classified as a thin fibre cement boards which are then fused together to form the composite fibre cement article. The composite fibre cement cladding article 500 is typically slightly thinner or equal to the thickness of a fibre cement cladding article that is suitable for use in a flat wall cladding system achieving similar wind loading properties required for such a system. In contrast, the fibre cement cladding article 600 illustrates that a similar configuration to that of cladding article 500 is possible without the portion of the bottom panel width $W_5$. It is clearly shown that this material need not be produced if the product blanks are manufactured by the processes of FIGS. 3A-3D, resulting in a further reduction of the material required. Typically, the composite fibre cement cladding article 600 is lighter than an equivalent sized board configured as for composite fibre cement cladding article 500 or a fibre cement article produced using for example the Hatschek process to a similar overall thickness whilst giving the aesthetic appearance of having a similar thickness. One advantage of such an arrangement is that it is possible to achieve a shadow line normally associated with thicker products when the composite fibre cement cladding article 600 is arranged in a cladding system such as, for example, a flat wall cladding system as previously described.

Figure 5A:
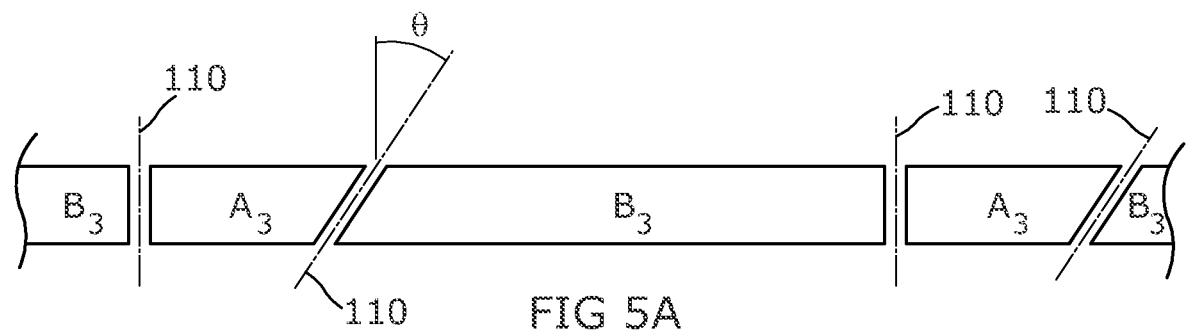
FIGS. 5A and 5B schematically illustrate an example additive manufacturing process for manufacturing product blanks for cladding articles having an external appearance similar to the cladding articles of FIGS. 1A-1F.
Figure 5B:
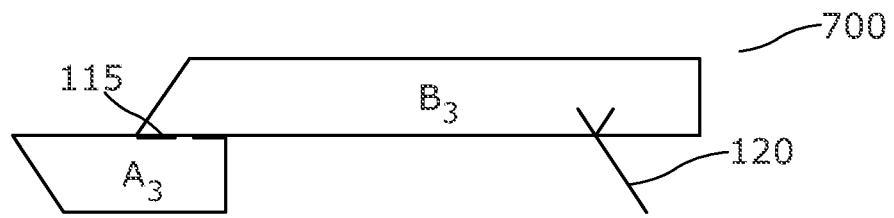

FIGS. 5A and 5B schematically illustrate a further example additive manufacturing process for creating pieces $A_3$, $B_3$ for use in manufacturing product blanks for cladding articles having an external appearance similar to the articles of FIGS. 1A and 1B. The example product blank of FIG. 5B may be produced by a process similar to that of the product blanks of FIGS. 3B and 3D. However, only a single bottom panel $A_3$ is used. Bottom panel $C_1$ or $C_2$ of FIGS. 3A-3D, which is not ultimately visible when the panels are in an installed configuration, may be omitted in the process of FIGS. 5A and 5B. At the time of manufacture, or subsequently (e.g., at or before a time of installation), a mounting clip 120 may be installed within the top panel $B_3$ to permit stacking of multiple cladding articles.

Figures 6A, 6B:
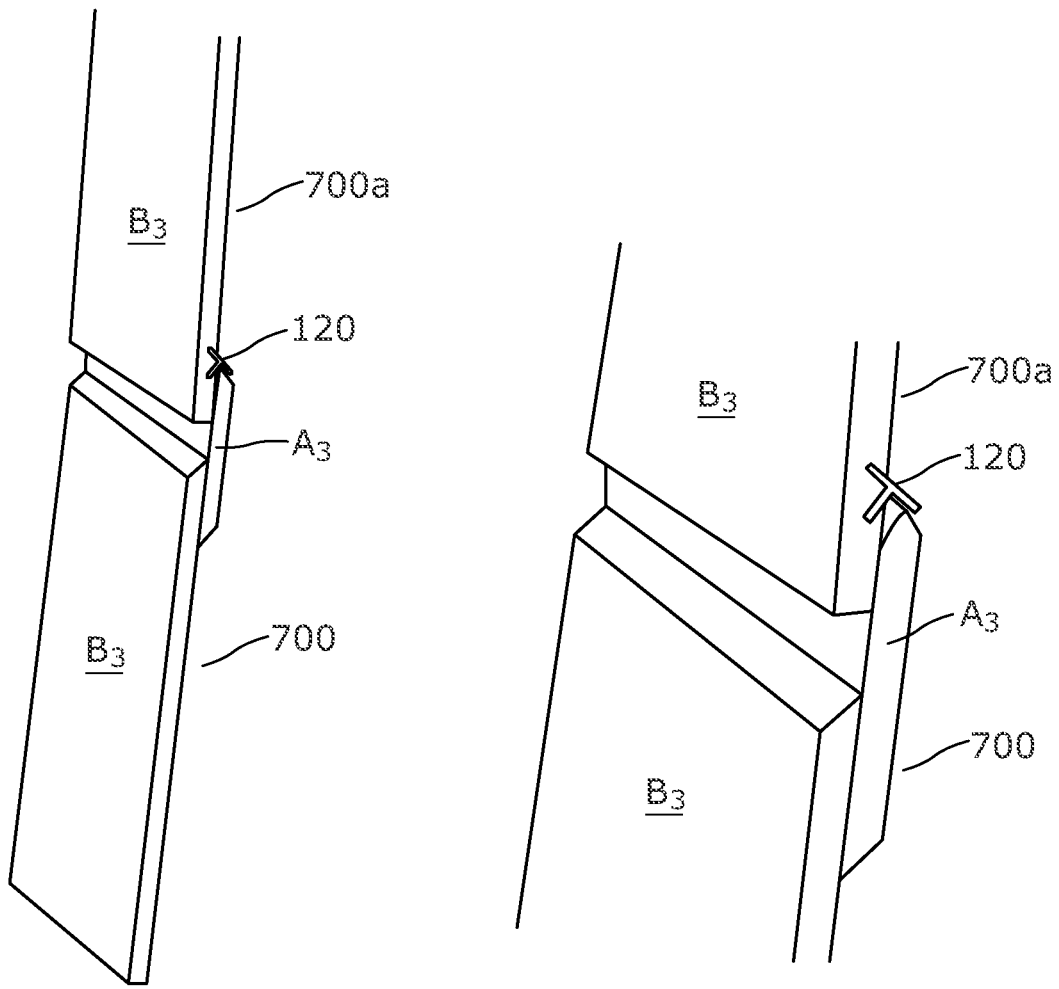
FIGS. 6A and 6B are side sectional perspective views of example cladding elements produced by the process of FIGS. 5A and 5B in a mounted configuration.

FIGS. 6A and 6B are of example cladding article 700 produced by the process of FIGS. 5A and 5B in a mounted configuration. As shown in FIGS. 6A and 6B, cladding article 700a having a clip 120 may be mounted such that the clip 120 rests on an upper surface of the lower or back layer $A_3$ of the cladding article 700 mounted below.

Figure 7:
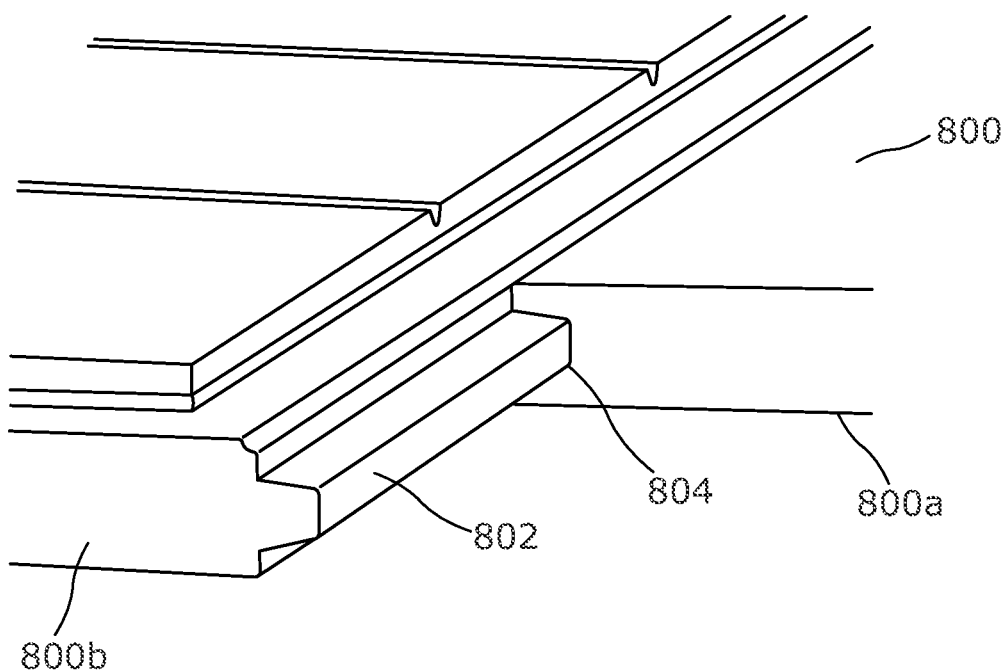
FIG. 7 is a side sectional perspective view showing an interlocking feature of an example flooring article.
Figure 8:
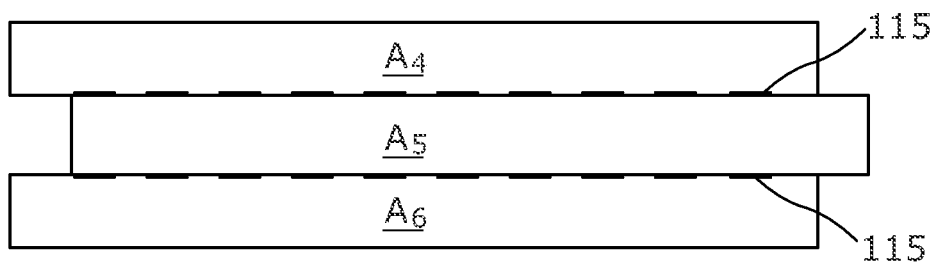
FIG. 8 schematically illustrates a product blank for manufacturing the flooring articles of FIG. 7.

FIG. 7 depicts an interlocking feature of example flooring article 800. In the example of FIG. 7, the flooring articles are monolithic and comprise a tongue 802 and groove 804 interlocking feature between abutting flooring articles 800a, 800b. As shown in FIG. 8, similarly shaped articles comprising a tongue and groove interlocking feature may be produced with reduced waste using the additive manufacturing methods described herein. For example, three panels $A_4$, $A_6$, $A_6$ may be produced in a thickness of nominally one-third the full thickness of a flooring article, and subsequently joined by fusion layers 115 to form a flooring article. In some embodiments, the three panels may be described as top face $A_4$, core $A_6$, and back face $A_6$ layers comprising the same or different materials. In some embodiments, different joining methods may be used to produce the two fusion layers 115.

Figure 9:
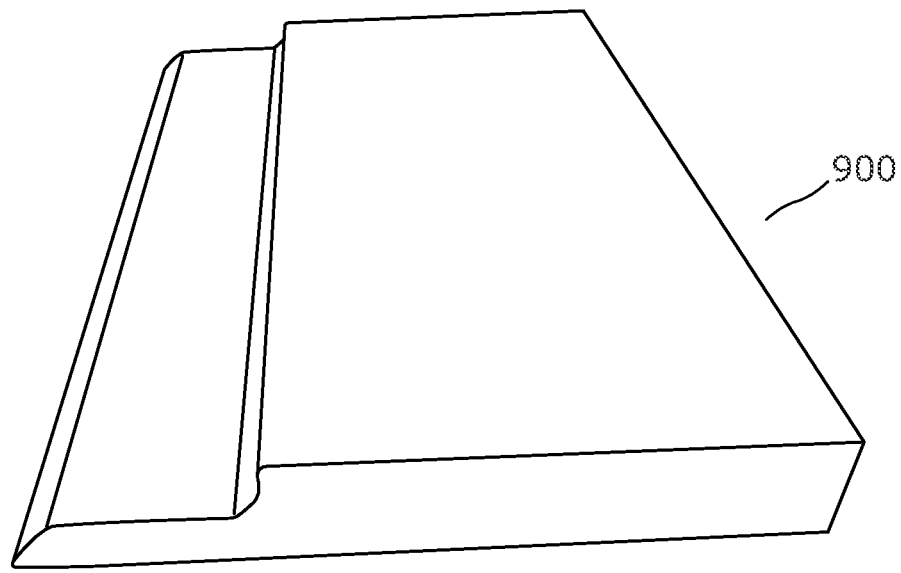
FIG. 9 is a perspective side view of a further example flooring article.
Figure 10A:
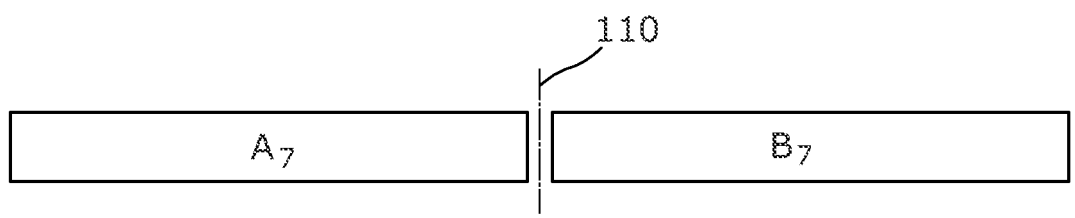
FIGS. 10A and 10B schematically illustrate an example additive manufacturing process for manufacturing product blanks for the flooring articles of FIG. 9.
Figure 10B:
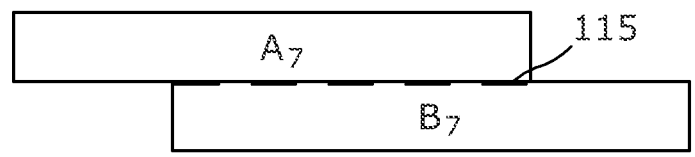

FIG. 9 depicts a further exemplary flooring article. FIGS. 10A and 1013 illustrate an example method of producing a product blank from section $A_7$, $B_7$ for the flooring article of FIG. 9, using the same or similar additive manufacturing processes as those described elsewhere herein.

Figure 11A:
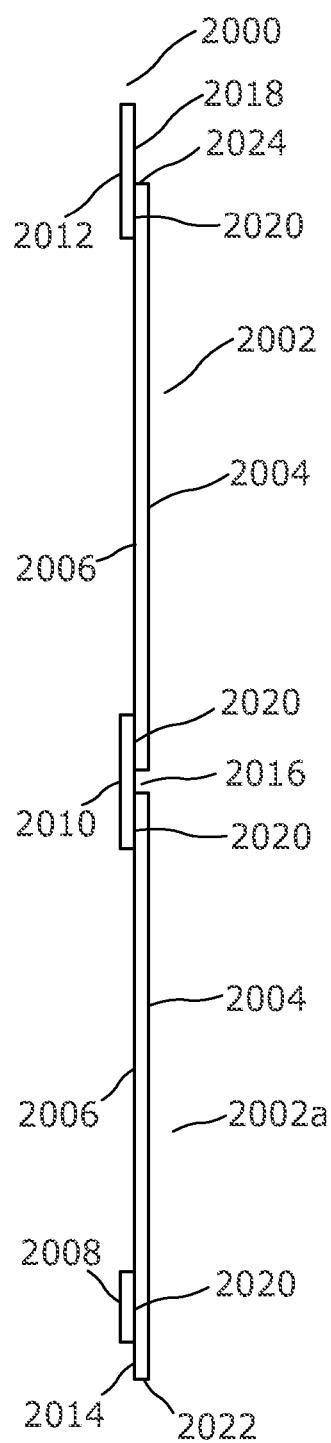
FIG. 11A is side view of a product blank for manufacturing the cladding article of FIG. 11B.

With reference to FIGS. 11A-11E, the manufacturing systems and methods of the present disclosure may be used in some embodiments to produce cladding articles 2000 having an extended profile. FIG. 11A illustrates an example cladding article product blank including three back layer panels 2008, 2010, 2012 and two front layer panels 2002, 2002a. Thus, the cladding article product blank of FIG. 11A may have a "double width" as compared to the cladding articles of FIGS. 1A-6B. In some cases, the reduced weight of the cladding articles due to omitting a portion of the bottom layer may make installation of double width or other extended profile panels feasible where weight may otherwise have made installation difficult if extended panels were produced in a monolithic fashion. In the embodiment shown, front layer panels 2002 and 2002a are spaced apart from each other on back layer panel 2010 such that a ship-lap type joint interface 2016 is created on the front face 2004 of cladding article product blank 2000. Fusion layers are located at the overlap areas 2020 between back layer panels 2008, 2010, 2012 and front layer panels 2002, 2002a. In the embodiment shown in FIG. 11C, the ship-lap type joint interface is in the form of a squared U-shaped channel 2016 comprising base member 2026, and opposing spaced apart side members 2027, 2028 extending orthogonally from base member 2026.

Back layer panel 2008 is offset of the rear face 2006 from the edge 2022 of panel 2002a toward central back layer panel 2010 to create an abutment zone 2014 intermediate the edge 2022 of panel 2002a and back layer panel 2008. In contrast back layer panel 2012 is offset on the rear face 2006 of panel 2002 away from central back layer panel 2008 such that a section of back layer panel 2012 projects beyond edge member 2024 of panel 2002 creating an overlap zone 2018. The manufacturing systems and methods of the present disclosure also facilitate the provision of other types of interface joints including for example, v-groove or a chamfered ship-lap type and so forth.

Figure 11B:
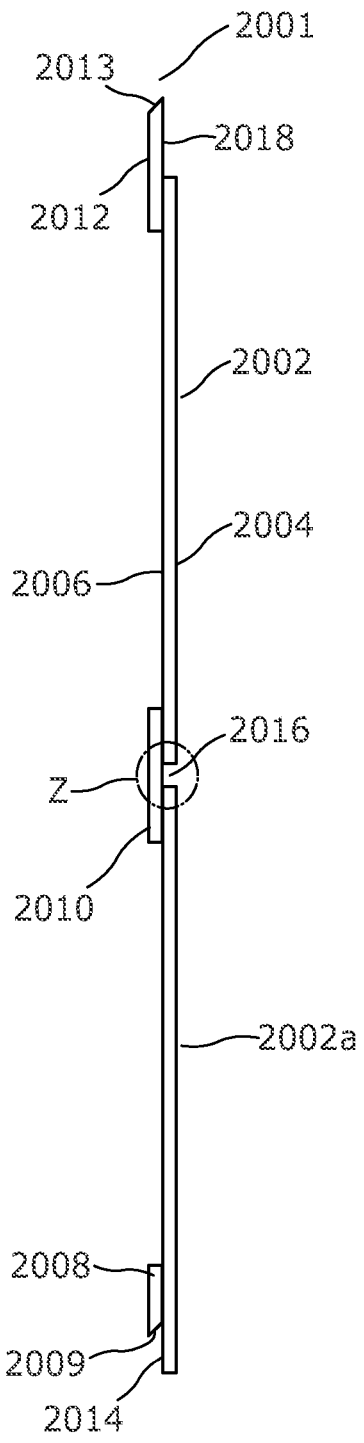
FIG. 11B is a side view of the cladding article formed from the product blank of FIG. 11A.
Figure 11C:
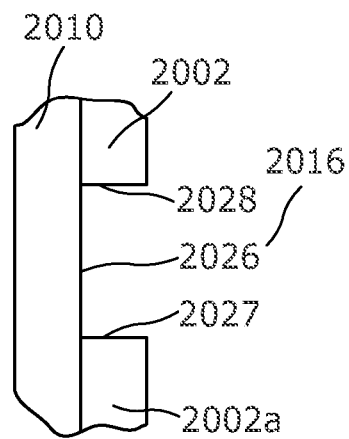
FIG. 11C is an enlarged side view of FIG. 11B.

In the example embodiment shown in FIG. 11A, cladding article product blank 2000 is manufactured using square-edged panel wherein each panel is approximately 7 mm thick. If one or more angled edges are required in the composite fibre cement cladding article instead of a square-edges, cladding article product blank 2000 can avail of a further optional manufacturing process step to create angled edges where desired as shown in FIG. 11B. The optional further manufacturing process step has the further advantage of also being able to remove any manufacturing variability from the component panels if desired, thereby further reducing the overall thickness of the composite cladding article.

In the example embodiment, cladding article product blank 2000 has been processed to create composite cladding article 2001 as shown in FIG. 11B, wherein an angled edge has been created in back layer panels 2008 and 2012. In the embodiment shown the angled edges comprise an angle of approximately 45° relative to the longitudinal axis of composite cladding article 2001. In addition, the process has widened the opening in ship-lap type joint interface 2016 such that the distance between opposing side members 2027, 2028 extending orthogonally from base member 2026 is widened. In the embodiment shown the distance between the side members 2027 and 2028 has extended from approximately 11 mm to approximately 15 mm. Furthermore, the process has also reduced the nominal thickness of the composite cladding article by approximately 4% of the total thickness of the cladding article product blank 2000, for example, from 14 mm (the thickness of one of back layer panels 2008, 2010 and 2012 when taken together with the thickness of one of the front layer panels 2002, 2002a) to approximately 13.4 mm.

Figure 17A:
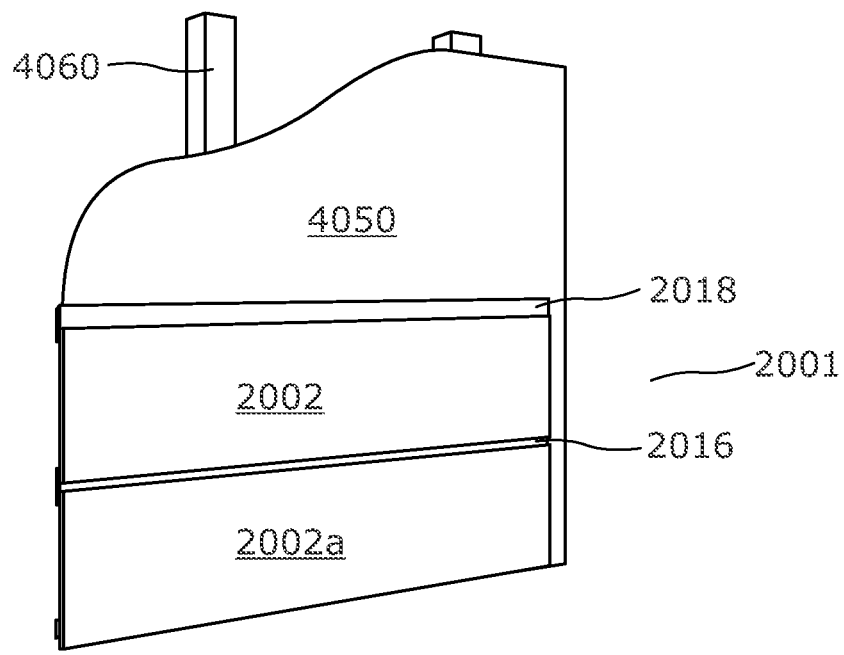
FIG. 17A is a front perspective sectional cut-away view of the cladding article of FIG. 11B in a mounted configuration.
Figure 17B:
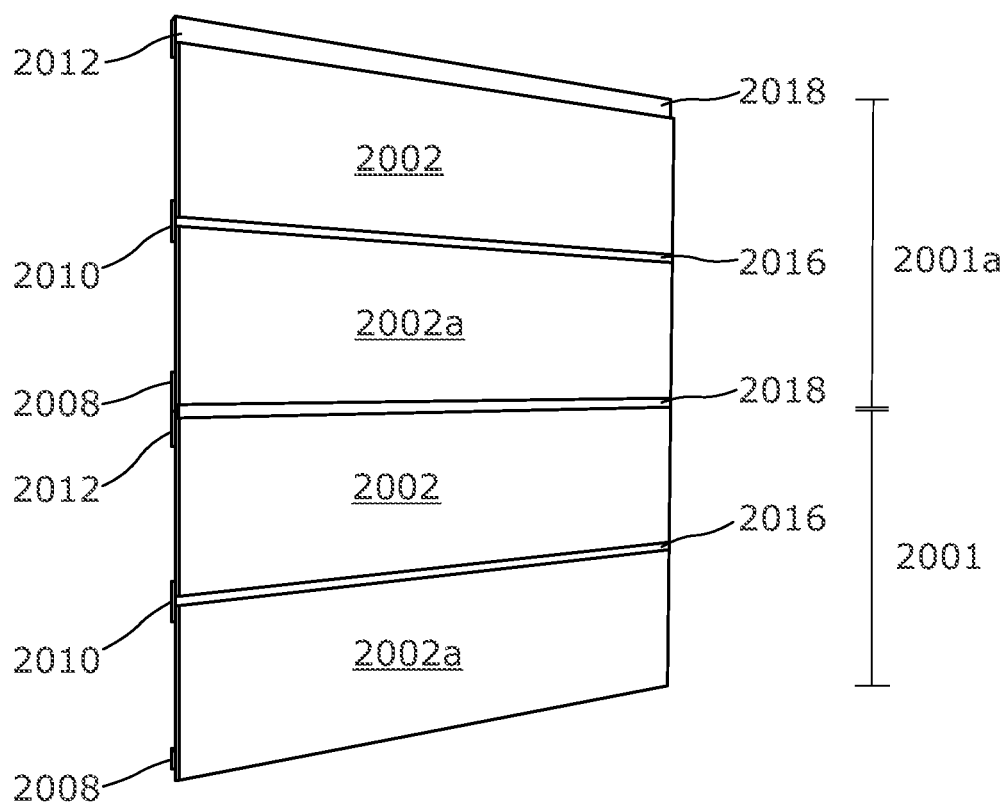
FIG. 17B is a front perspective sectional view of the cladding article of FIG. 11B in a mounted configuration.

Turning now to FIGS. 17A and 17B, there is shown in FIG. 17A the composite cladding article 2001 of FIG. 11B mounted to a substrate 4060 covered with building wrap 4050. A subsequent composite cladding panel 2001a which is identical to composite cladding panel 2001 is mounted to the first composite cladding panel 2001 creating a cladding system. The advantage of such a system is that the composite cladding panels 2001 and 2001a are easier to handle and faster to install due to having a "double width" when compared to installing the cladding articles of FIGS. 1A-6B. Furthermore, as previously described the thickness and configuration of the cladding elements impact the wind loading capacity of the cladding elements when arranged in a cladding system. It would normally be expected that use of thinner cladding elements would reduce the wind load capacity when compared with equivalent thicker cladding elements, particularly when the thickness of the cladding element spans the entire width of the cladding element as shown in FIGS. 2A and 2E. It was determined that the wind load capacity of the "double width" cladding article as shown in FIGS. 11B, 11D, 11E, 17A and 17B was comparable with the wind load capacity of cladding articles such as Stria™ Cladding.

FIGS. 12A-12C further illustrates vertical stacking of cladding article 600 of the present disclosure (as previously shown in FIG. 4) being mounted to a substrate 602, such as, for example Oriented Strand Board (OSB) supported by mounting clip 122. In the embodiment shown, a second cladding member 600a is subsequently mounted to the substrate 602. FIG. 12A is an enlarged view of section X of FIG. 12B showing that the ship-lap type joint interface 604 is in the form of a U-shaped channel in which on side member is a square edge side member 606 and the other opposing side member is a bevelled side member 608.

Figure 13A:
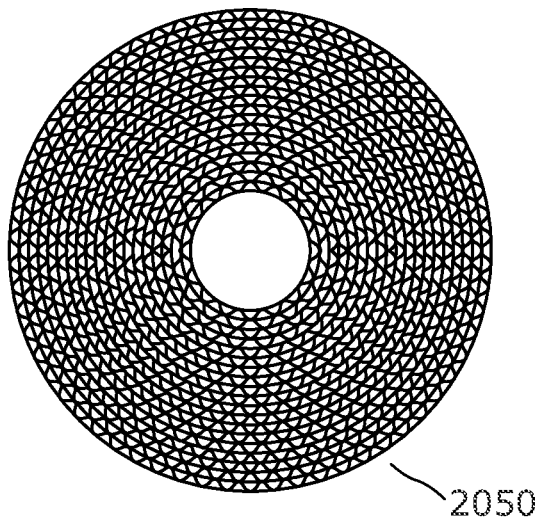
FIGS. 13A to 13E illustrate an example embodiment of a clip for mounting the cladding element of FIG. 12C.
Figure 13B:
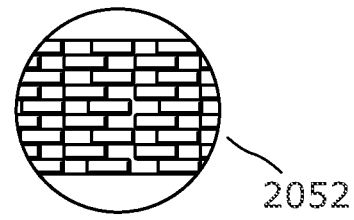
Figure 13C:
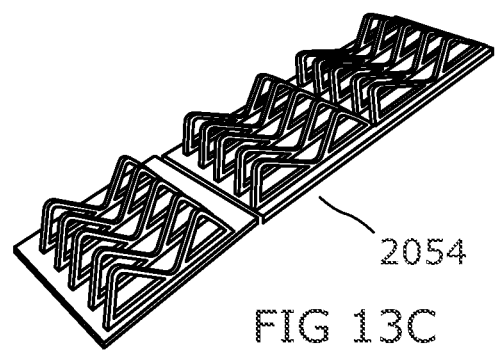
Figure 13D:
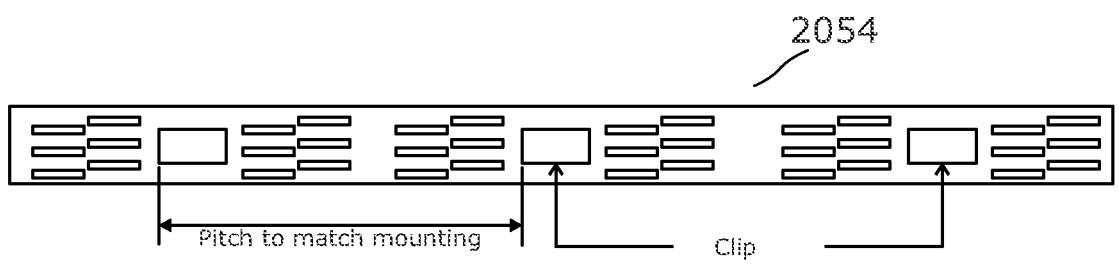
Figure 13E:
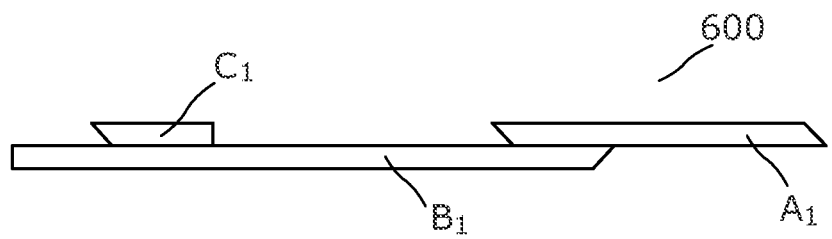

FIGS. 13A-13D illustrates an example embodiment of a clip for mounting cladding articles, such as the composite cladding article shown in FIG. 13E. In the embodiment shown the clip is a knuckle nail plate strip 2050, 2052, 2054. The advantage of using such a clip is that the strip can be broken or cut to match the mounting area as required by the end user. In some embodiments, the clip of FIG. 13 may be used as the "Mounting clip" of FIGS. 12.

In some embodiments, the systems and methods of the present disclosure may be used in conjunction with through-pigmentation to further enhance the production of cladding, flooring, decking, or other articles. Articles such as fibre cement cladding articles are typically desired in a particular colour in order to achieve a pleasant aesthetic effect. Typically, fibre cement articles are produced in a single colour (e.g., a grey, brown, beige, or other natural colour), and covered with one or more layers of primer and/or paint to achieve a final colour prior to installation. In other cases, fibre cement articles may be installed in a natural colour and painted after installation.

As an alternative to post-manufacture painting, it may be desirable to use through-pigmentation, in which pigments or other colouring materials are included within the fibre cement slurry during manufacturing, such that the finished cladding articles are produced in the desired colour and do not require additional priming and/or painting. Through-pigmentation may be desirable at least because it can simplify manufacturing processes, produce a more consistent coloration of fibre cement articles, and/or reduce the opportunity for errors in the painting process. However, because only a portion of the surface area of a cladding article is visible in an installed configuration, through-pigmentation may not be cost-effective in existing processes due to the amount of "wasted" pigment (e.g., the pigment located within the interior of the fibre cement and/or along the non-visible surfaces of the cladding).

Figure 14:
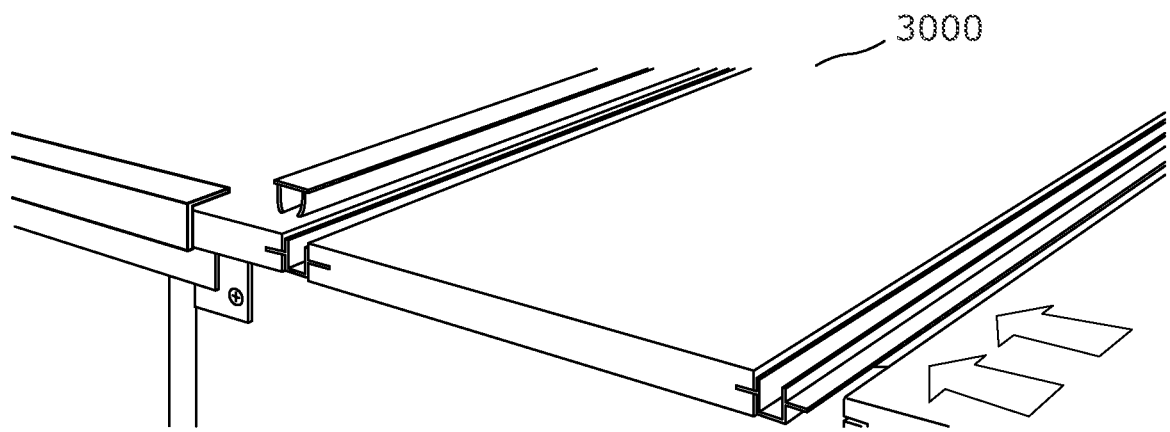
FIG. 14 is a perspective side sectional view of a further example configuration of a flooring article when in a mounted configuration with joining elements.

In some embodiments, the additive manufacturing processes described herein may allow for cost-effective through-pigmentation of fibre cement articles. As shown in FIG. 14, an example decking system 3000 includes a plurality of decking articles secured by clips configured to seat within grooves in the sides of the decking articles. In this example decking system, the portions of the decking articles above the grooves are visible after installation, while the portions of the decking articles below the grooves are hidden by the securing clips.

Figure 15:
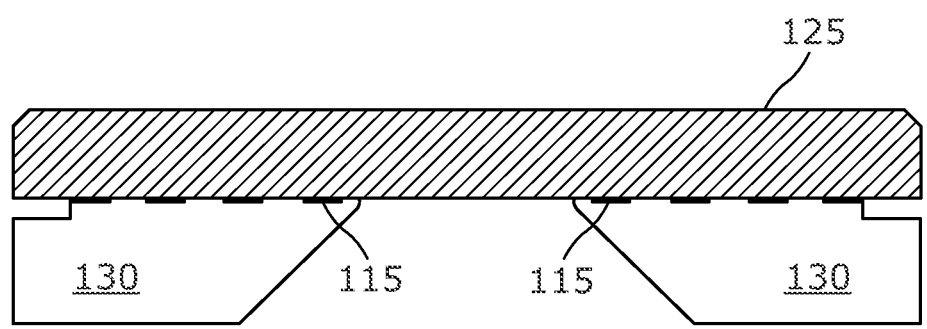
FIG. 15 schematically illustrates an example flooring element similar to that of FIG. 14 produced using through pigmentation in combination with additive manufacturing processes described herein.

Accordingly, decking articles may be produced according to the processes described herein, as shown in FIG. 15. In the example decking articles of FIG. 15, pigmented top panels 125 are produced using through-pigmentation in a width such as nominally one-half or one-third the thickness of the full decking article. Bottom panels 130 are produced without pigmentation and joined to the top panel 125 by fusion layer 115, using any of the joining methods described herein. Thus, the decking article of FIG. 15 may have a reduced weight compared to the decking articles of FIG. 14. In addition, the visible portion (e.g., top panel 125) has the desirable aesthetic attributes of through-pigmented fibre cement articles, while the bottom panels 130 do not include any wasted pigment. Thus, the amount of pigment or other colouring material used to produce through-pigmented articles may be reduced by up to 50% or more relative to typical monolithic and subtractive manufacturing methods.

Figures 16A, 16B, 16C:
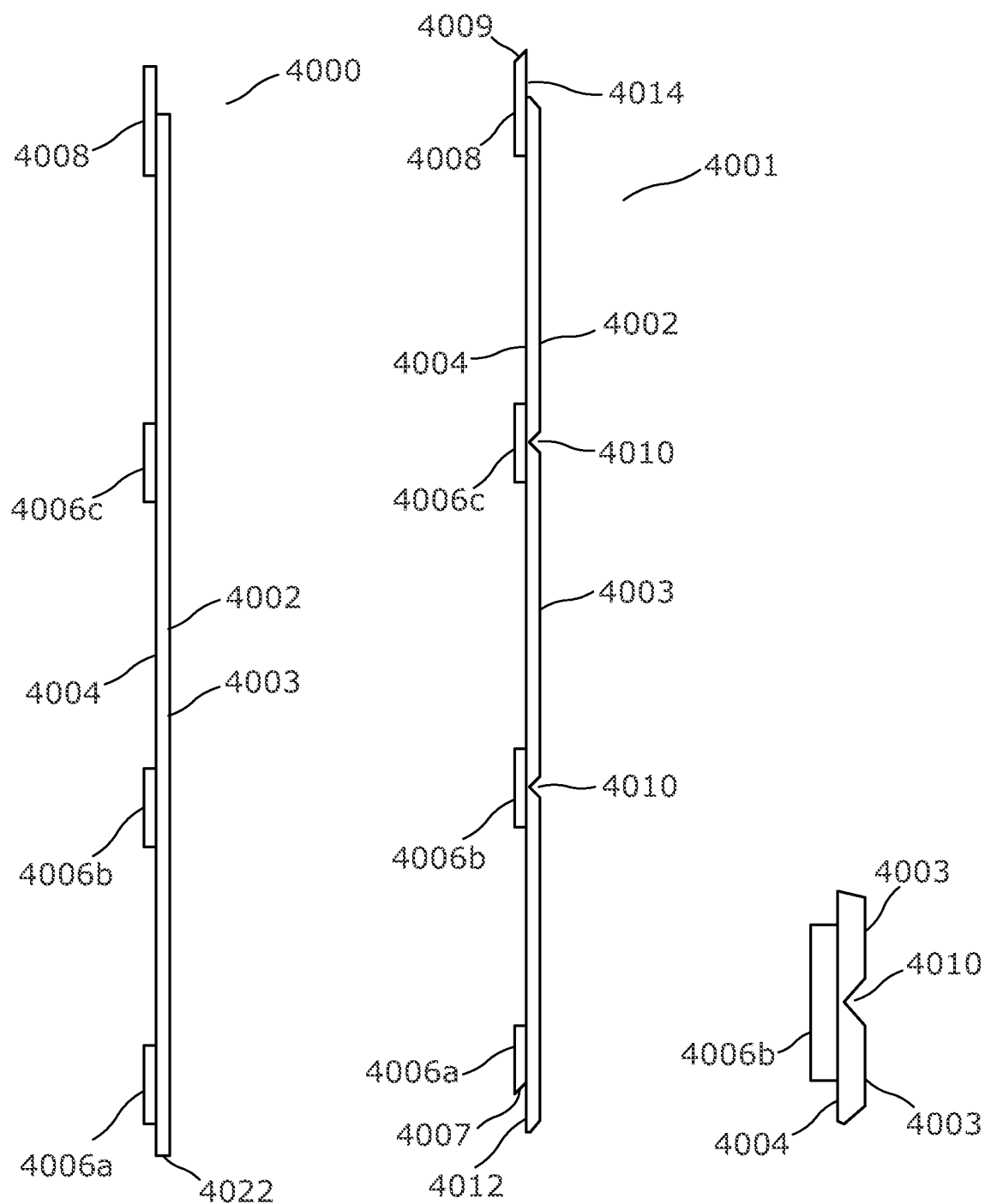
FIG. 16A is side view of a product blank for manufacturing the cladding article of FIG. 16B.
FIG. 16B is a side view of the cladding article formed from the product blank of FIG. 16A.
FIG. 16C is an enlarged side view of detail C of FIG. 16B.

A further exemplary embodiment is shown in FIGS. 16A-16C. As before, the manufacturing systems and methods of the present disclosure may be used in some embodiments to produce cladding articles 4001 having an extended profile with a v-groove aesthetic 4010 on the front face 4003. FIG. 16A illustrates an example cladding article product blank 4000 including four back layer panels 4006a, 4006b, 4006c and 4008 located on the rear face 4004 of a front layer panel 4002. Similarly, to the composite cladding article of FIG. 11B, cladding article product blank of FIG. 16A and the cladding article of FIG. 16B are considered to have a "triple width" when compared to the cladding articles of FIGS. 1A-6B due to the location of the 'v-groove' aesthetic on the front face 4003 of the cladding article 4001. The position of four back layer panels 4006b and 4006c provide support to the front layer panel 4002 at the location of the 'v-groove' aesthetic 4010 in the front layer panel 4002. In one embodiment it is possible to increase the frequency of the 'v-groove' aesthetic by increasing the frequency of supporting back layer panels. Accordingly, it is possible to have a larger number of 'v-groove' aesthetics than that shown in FIG. 16B.

Referring now to the embodiment shown in FIGS. 16A and 16B, back layer panels 4006b and 4006c are located on the rear face 4004 of front layer panel 4002 at the point where the 'v-groove' aesthetic is located on the front face 4003 of the front layer panel 4002. The v-groove aesthetic shown can be any desired width and depth however in the exemplary embodiment shown the width at the open end of the v-groove aesthetic is approximately 12.7 mmm, whilst the depth of the v-groove' aesthetic is between approximately 90 and 97% of the thickness of the front layer panel 4002. The angle of the pointed end of the 'v-groove' aesthetic remote from the open end is approximately, 37.3°. In some embodiments it may be desirable to have a less acute chamfer angle which will vary the width and depth of the v-groove aesthetic accordingly. In further embodiments, it may be desirable to have an arcuate chamfered surface as part of the v-groove aesthetic.

In a similar manner to that of cladding element 2001 of FIG. 11B, back layer panel 4006a is offset on the rear face 4004 from the edge 4022 of panel 4002 to create an abutment zone 4012 intermediate the edge 4022 of panel 4002 and back layer panel 4006a. Back layer panel 4008 is also offset on the rear face 4004 of panel 4002 such that a section of back layer panel 4008 projects beyond edge member 4024 of panel 4002 creating an overlap zone 4014. When mounting cladding elements 4001 in a cladding system, consecutive cladding elements 4001 seat together in series such that abutment zone 4102 is seated in an abutting arrangement with overlap zone 4014. In some embodiments, securing means such as mechanical or chemical fasteners can be used to secure overlap zone 4014 and thereby cladding element 4001 to a substrate. The securing means will be covered by the abutment zone 4012 of the next cladding elements 4001 such that all or a portion of the securing means are covered by subsequent cladding elements 4001 in a series.

In the example embodiment shown in FIG. 16A, cladding article product blank 4000 is manufactured using square-edged panels wherein each panel is approximately 7 mm thick. As before if one or more angled edges are required in the composite fibre cement cladding article instead of a square-edges, cladding article product blank 4000 is further processed to create angled edges where desired as shown in FIG. 16B. The optional further manufacturing process step has the further advantage of also being able to create the v-groove aesthetic 4010 seen on the front face 4003 of the composite cladding article 4001.

In the example embodiment, shown in FIG. 16B, composite cladding article 4001 has been processed to create an angled edge 4007, 4009 in back layer panels 4006a and 4008. In the embodiment shown the angled edges comprise an angle of approximately 45° relative to the longitudinal axis of composite cladding article 4001.

Figure 18A:
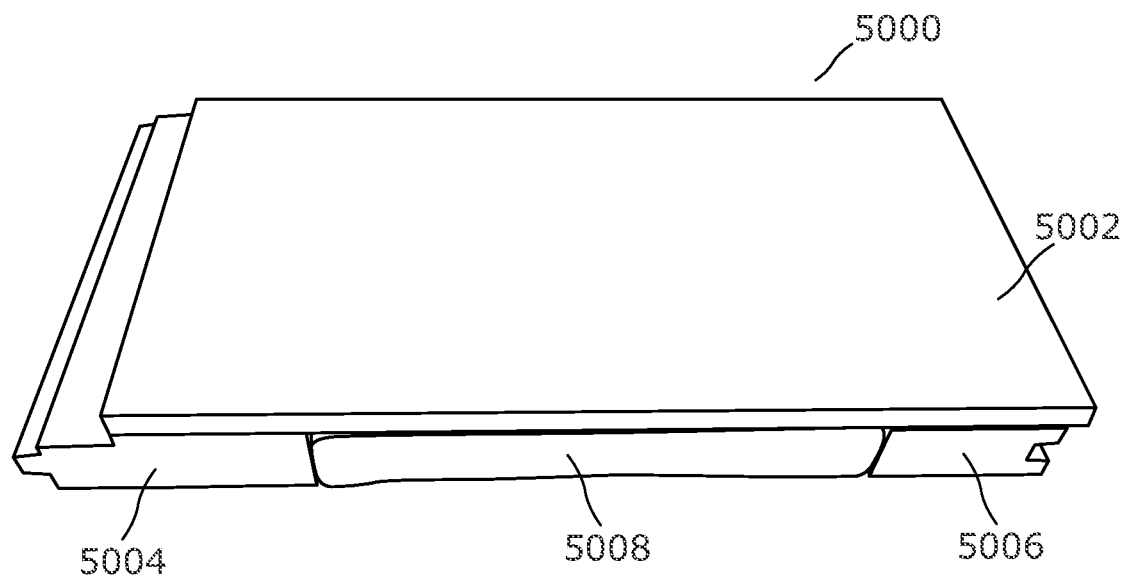
FIG. 18A is a top perspective view of the cladding article of FIG. 11B with insulation installed on the rear face.
Figure 18B:
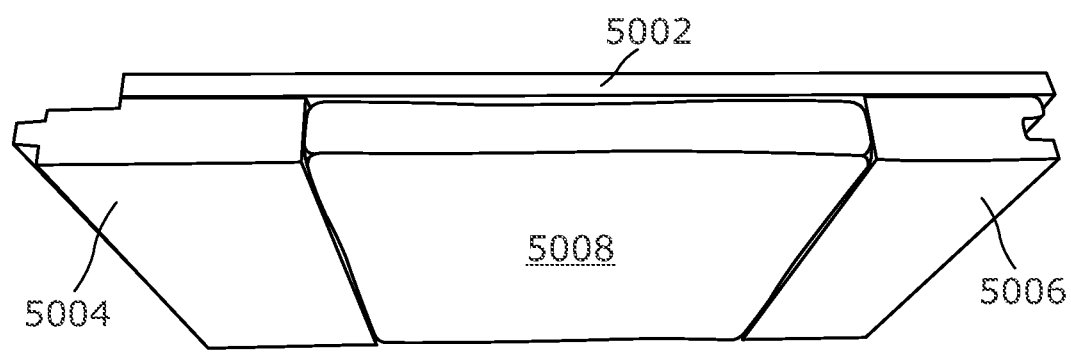
FIG. 18B is a bottom perspective view of the cladding article to FIG. 11B with insulation installed on the rear face.

FIGS. 18A and 18B depict a further exemplary embodiment of the composite cladding article 5000 of the present disclosure. In this exemplary embodiment 5000 a tongue 5004 and groove 5006 interlocking layer has been fused to top layer 5002. An insulation element 5008, for example a rigid vacuum insulation board has been placed in between the tongue 5004 and groove 5006 component layers. It will of course be understood that it is possible to provide an insulation element such as that shown in this exemplary embodiment in any of the embodiments of the present disclosure. The insulation element can seat between components of the rear layer or in abutment to the rear layer remote the top layer as determined by the configuration of the composite cladding article.

Figure 19:
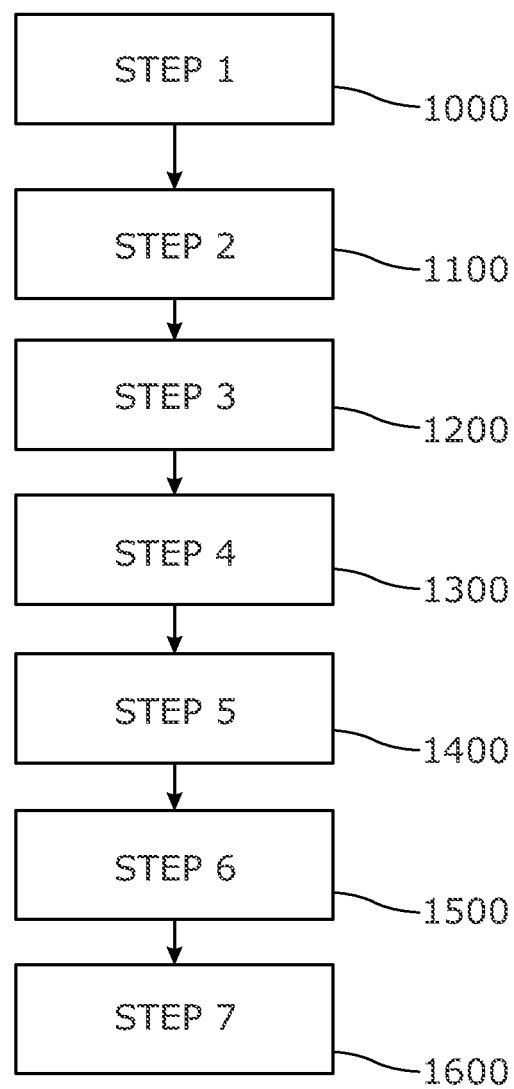
FIG. 19 schematically illustrates the steps of the additive manufacturing process for manufacturing cladding elements of the present disclosure.

FIG. 19 is a flow diagram outlining the steps of an exemplary method of manufacturing the composite cladding article of the present disclosure.

1000, Step 1 of the process produces at least one sheet of fibre cement or other material, using for example, the Hatschek process or any other suitable manufacturing process. Each sheet of fibre cement having a first face and an opposing second face. The first and second face also being referred to as the front and rear face respectively.

1100, Step 2 of the process, cutting each sheet of fibre cement or other material along a cutting axis to form at least two fibre cement or other material component workpieces. The dimensions of the cut material being determined by the shape and size of the desired composite cladding article being formed.

In some embodiments, the fibre cement material at Step 1 is a green sheet material, in which case a further step (not shown), curing the fibre cement green sheet material is also included in process. In some embodiments, the step of curing the fibre cement green sheet material occurs prior to Step 2, i.e. before cutting. In other alternate embodiments, the step of curing the fibre cement green sheet material occurs post Step 2, i.e. after cutting. The step of curing the fibre cement green sheet material comprises air curing or autoclave curing using known conditions in the art.

1200, Step 3 of the process, applying adhesive material to at least one of the cut fibre cement or other material component workpieces. It is understood that the conditions that the adhesive material is applied to the workpieces should conform to those conditions as provided by the adhesive material manufacturer.

1300, Step 4 of the process, assembling the cladding article product blank by locating at least one of the cut fibre cement or other material component workpieces with adhesive material applied thereon to at least another cut fibre cement or other material component workpiece to create the cladding article product blank.

1400, Step 5 of the process, cure the adhesive material.

1500, Step 6 of the process, post assembly processing, machining the cladding article product blank as necessary to create the composite cladding article.

1600, Step 7 of the process, coating the composite cladding article as necessary to seal and/or provide a surface finish to the composite cladding article.

In some embodiments, the adhesive material used to fuse the workpieces together comprises a one-component fibre-reinforced adhesive material pre-polymer. Such adhesive materials generally cure with substrate moisture and/or ambient humidity to create a water-insoluble resin. If the substrate moisture and/ambient humidity is insufficient to cure the adhesive material, an additional optional step applying moisture to the surfaces of the workpieces prior to Step 3 may also be required. The adhesive material is generally applied in bead form to ensure adequate dispersal of the adhesive material after assembly of the composite cladding article.

In some embodiments of the present disclosure, there is provided a composite fibre cement cladding element, a method of manufacturing a composite fibre cement cladding element and a cladding system comprising a composite fibre cement cladding element as set out in the following statements:

1. A composite fibre cement cladding element, comprising
   a plurality of fibre cement component pieces,
      each of the fibre cement component pieces comprising at least a front face and a rear face, wherein at least a portion of the front face of a first fibre cement component piece and at least a portion of the front face of a second fibre cement component piece are bonded to at least a portion of the rear face of a third fibre cement component piece; and
      at least a portion of the front face of the second fibre cement component piece and at least a portion of the front face of a fourth fibre cement component piece are bonded to at least a portion of the rear face of a fifth fibre cement component piece such that the third and fifth fibre cement component piece are spaced apart from each other.
2. A composite fibre cement cladding element as recited in statement 1, wherein the at least a portion of the front face of the first fibre cement component piece is bonded to the rear face of the third fibre cement component piece such that the first fibre cement component piece is offset from the third fibre cement component piece forming a first interlocking feature.
3. A composite fibre cement cladding element as recited in statement 1 or statement 2, wherein the at least a portion of the front face of the fourth fibre cement component piece is bonded to the rear face of the fifth fibre cement component piece such that the fourth fibre cement component piece forms a second interlocking feature.
4. A composite fibre cement cladding element, comprising at least a first fibre cement component piece and a second fibre cement component piece, the first fibre cement component piece having a front face and a rear face opposite the front face,
   the second fibre cement component piece having a front face and a rear face opposite the front face, wherein at least a portion of the front face of the second fibre cement component piece is bonded to at least a portion of the rear face of the first fibre cement component piece such that the second fibre cement component piece is offset from the first fibre cement component piece.
5. A composite fibre cement cladding element, as recited in statement 4, wherein the composite fibre cement cladding element further comprises at least a third fibre cement component piece, the third fibre cement component piece having a front face and a rear face opposite the front face,
   wherein at least a portion of the front face of the third fibre cement component piece is bonded to at least a portion of the rear face of the first fibre cement component piece
6. A composite fibre cement cladding element as recited in any one of statement 4 or statement 5, wherein the composite fibre cement cladding element further comprises a clip mounted to the rear face of the composite fibre cement cladding element.
7. A composite fibre cement cladding element as recited in any one of statement 4 or statement 5, wherein at least one of the fibre cement component pieces comprises a pigment dispersed throughout the fibre cement component piece.
8. A composite fibre cement cladding element as recited in any one of the preceding statements wherein one or more of the fibre cement component pieces, comprise one or more interface aesthetics on the front face.
9. A composite fibre cement cladding element as recited in statement 8, wherein the one or more interface aesthetics is a v-groove.
10. A composite fibre cement cladding element as recited in statement 8, wherein the one or more interface aesthetics is a ship-lap profile.
11. A composite fibre cement cladding element as recited in any one of the preceding statements, wherein the fibre cement component piece are bonded to each other by a layer of a plastic, a cured cementitious slurry, or an adhesive.
12. A composite fibre cement cladding element as claimed recited in Claim statement 11, wherein the adhesive comprises a polyurethane adhesive.
13. A composite fibre cement cladding element as recited in statement 12, wherein the polyurethane adhesive comprises a moisture curing polyurethane reinforced adhesive material.
14. A composite fibre cement cladding element as recited in statement 11, wherein the adhesive comprises a modified silyl polymer adhesive.
15. A composite fibre cement cladding element as recited in any one of statements 11 to 14, wherein the thickness of the adhesive layer intermediate the front face of the second fibre cement component piece and the least a portion of the rear face of the first fibre cement component piece is between 0.05 mm and 0.15 mm.
16. A composite fibre cement cladding element as recited in any one of statements 11 to 15, wherein the surface area coverage of the adhesive layer is 40% or greater of the total surface area being bonded.
17. A method of manufacturing a composite fibre cement cladding element, the method comprising:
   producing at least one sheet of fibre cement or other material;
   cutting each sheet of fibre cement or other material along a cutting axis to form at least two fibre cement component workpieces;
   applying adhesive material to at least one of the cut fibre cement component workpieces;
   locating at least one of the cut fibre cement component workpieces with adhesive material applied thereon to at least another cut fibre cement component workpiece to assemble a cladding article product blank;
curing the adhesive material in the assembled cladding article product blank; and processing the cladding article product blank as necessary to create the composite cladding article.

18. A method of manufacturing a fiber cement article as recited in statement 17, wherein the method further comprises curing the fibre cement material using air curing or autoclave curing techniques.

19. A method of manufacturing a fiber cement article as recited in statement 17, wherein the method further comprises applying moisture to the surfaces of at least one of the cut the fibre cement component workpieces prior to applying adhesive material 20. A method of manufacturing a composite fibre cement cladding article comprising:
    producing a first fiber cement panel having a front face and a rear face;
    producing a second fiber cement panel having a front face and a rear face; and
    joining the first fiber cement panel to the second fiber cement panel such that at least a portion of the front face of the second fiber cement panel lies adjacent to the rear face of the first fiber cement panel and at least one edge of first fiber cement panel is offset from at least one edge of the second fiber cement panel.

21. The method of statement 20, further comprising:
producing a third fiber cement panel having a front face and a rear face; and
joining the third fiber cement panel to the first fiber cement panel such that at least a portion of the front face of the third fiber cement panel lies adjacent to the rear face of the first fiber cement panel, wherein the rear face of the second fiber cement panel is substantially coplanar with the rear face of the third fiber cement panel.

22. The method of statement 21, wherein the third fiber cement panel is spaced from the second fiber cement panel along a direction parallel to the rear face of the first fiber cement panel.

23. The method of statement 20 or 21, wherein the joining comprises overlaying and pressing the first fiber cement panel and the second fiber cement panel to fuse the rear face of the first fiber cement panel and the front face of the first fiber cement panel.

24. The method of statement 23, further comprising, subsequent to the pressing, curing the first fiber cement panel and the second fiber cement panel at an elevated temperature.

25. The method of statement 20, wherein the joining comprises:
    disposing a layer of polymeric material between the first fiber cement panel and the second fiber cement panel, the polymeric material having a melting point less than or equal to a curing temperature of the fiber cement article;
    curing the first fiber cement panel and the second fiber cement panel at the curing temperature to melt the layer of polymeric material; and
    cooling the first fiber cement panel and the second fiber cement panel to a temperature below the melting point such that the polymeric material bonds the rear face of the first fiber cement panel to the front face of the second fiber cement panel.

26. The method of statement 20, wherein the joining comprises:
    disposing a layer of a cementitious slurry between the first fiber cement panel and the second fiber cement panel; and
    curing the first fiber cement panel, the second fiber cement panel, and the cementitious slurry such that the cured cementitious slurry bonds the rear face of the first fiber cement panel to the front face of the second fiber cement panel.

27. The method of statement 26, wherein the cementitious slurry comprises a cement and a siliceous material.

28. The method of statement 20, wherein the joining comprises: curing the first fiber cement panel;
curing the second fiber cement panel; and
disposing a layer of an adhesive between the rear face of the first fiber cement panel and the front face of the second fiber cement panel such that the adhesive bonds the rear face of the first fiber cement panel to the front face of the second fiber cement panel.

29. The method of statement 20, further comprising removing at least a portion of the first or second fiber cement panel.

30. The method of statement 20, wherein producing the first and second fiber cement panels comprises:
    forming a substantially planar sheet of fiber cement; and
    cutting the first and second fiber cement panels out of the substantially planar sheet of fiber cement.

31. The method of statement 20, wherein the fiber cement articles comprises at least one of an exterior cladding article, an interior cladding article, a decking article, or a flooring article.

32. The method of statement 20, wherein the first fiber cement panel comprises a pigment dispersed throughout the first fiber cement panel.

33. The method of statement 32, wherein the second fiber cement panel does not comprise the pigment, and wherein the second fiber cement panel is not visible in an installed configuration of the fiber cement article.

34. A cladding system comprising a plurality of composite fibre cement cladding elements, the system comprising:
    first and second composite fibre cement cladding elements, each of the first and second composite fibre cement cladding elements comprising a composite cladding element as recited in any one of statements 1 to 14 wherein the first and second composite fibre cement cladding element seat together to form a cladding system whereby the first and second cladding system are parallel and co-planar.

Although the embodiments have been described with reference to specific examples, it will be appreciated by those skilled in the art that the disclosure may be embodied in many other forms.

It is also contemplated that various combinations or sub-combinations of the specific features and aspects of the embodiments may be made and still fall within the scope of the disclosure. Accordingly, it should be understood that various features and aspects of the disclosed embodiments can be combined with or substituted for one another in order to form varying modes of the disclosed embodiment. Thus, it is intended that the scope of the present disclosure herein disclosed should not be limited by the particular disclosed embodiments described above but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

It will of course be understood that the invention is not limited to the specific details described herein, which are given by way of example only, and that various modifications and alterations are possible within the scope of the disclosure as defined in the appended claims.

Certain features that are described in this disclosure in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations, one or more features from a claimed combination can, in some cases, be excised from the combination, and the combination may be claimed as any sub combination or variation of any sub combination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as 'can', 'could', 'might', or 'may', unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase 'at least one of X, Y, and Z' unless specifically stated otherwise, is otherwise understood with the context as used in general to convey that an item, term, etc. may be either X, Y or Z. Thus, such conjunctive language is not generally intended to imply that certain embodiments require the presence of at least one of X, at least one of Y, and at least one of Z.

Language of degree used herein, such as the terms 'approximately', 'about', 'generally' and 'substantially' as used herein represent a value, amount, or characteristic close to the stated value, amount or characteristic that still performs a desired function or achieves a desired result. For example, the terms 'approximately', 'about', 'generally' and 'substantially' may refer to an amount that is within less than or equal to 10% of, within less than or equal to 5% of, within less than or equal to 1% of, within less than or equal to 0.1% of, and within less than or equal to 0.01% of the stated amount.

Although making and using various embodiments are discussed in detail below, it should be appreciated that the description provides many inventive concepts that may be embodied in a wide variety of contexts. The specific aspects and embodiments discussed herein are merely illustrative of ways to make and use the systems and methods disclosed herein and do not limit the scope of the disclosure. The systems and methods described herein may be used in conjunction with fibre cement manufacturing product blanks and are described herein with reference to this application. However, it will be appreciated that the disclosure is not limited to this particular field of use.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practised using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A method of manufacturing a fiber cement article comprising:
   producing a first fiber cement panel having a front face and a rear face;
   producing a second fiber cement panel having a front face and a rear face;
   producing a third fiber cement panel having a front face and a rear face;
   joining the first fiber cement panel to the second fiber cement panel such that at least a portion of the front face of the second fiber cement panel lies adjacent to the rear face of the first fiber cement panel and at least one edge of first fiber cement panel is offset from at least one edge of the second fiber cement panel; and
   joining the third fiber cement panel to the first fiber cement panel such that at least a portion of the front face of the third fiber cement panel lies adjacent to the rear face of the first fiber cement panel, wherein the rear face of the second fiber cement panel is substantially coplanar with the rear face of the third fiber cement panel.

2. The method of claim 1, wherein the method further comprises curing the fiber cement material using air curing or autoclave curing techniques.

3. The method of claim 1, wherein the third fiber cement panel is spaced from the second fiber cement panel along a direction parallel to the rear face of the first fiber cement panel.

4. The method of claim 1, wherein the joining comprises overlaying and pressing the first fiber cement panel and the second fiber cement panel to fuse the rear face of the first fiber cement panel and the front face of the first fiber cement panel.

5. The method of claim 4, further comprising, subsequent to the pressing, curing the first fiber cement panel and the second fiber cement panel at an elevated temperature.

6. The method of claim 1, wherein the joining comprises:
disposing a layer of polymeric material between the first fiber cement panel and the second fiber cement panel, the polymeric material having a melting point less than or equal to a curing temperature of the fiber cement article;
curing the first fiber cement panel and the second fiber cement panel at the curing temperature to melt the layer of polymeric material; and
cooling the first fiber cement panel and the second fiber cement panel to a temperature below the melting point such that the polymeric material bonds the rear face of the first fiber cement panel to the front face of the second fiber cement panel.

7. The method of claim 1, wherein the joining comprises:
disposing a layer of a cementitious slurry between the first fiber cement panel and the second fiber cement panel; and
curing the first fiber cement panel, the second fiber cement panel, and the cementitious slurry such that the cured cementitious slurry bonds the rear face of the first fiber cement panel to the front face of the second fiber cement panel.

8. The method of claim 7, wherein the cementitious slurry comprises a cement and a siliceous material.

9. The method of claim 1, wherein the joining comprises:
curing the first fiber cement panel;
curing the second fiber cement panel; and
disposing a layer of an adhesive between the rear face of the first fiber cement panel and the front face of the second fiber cement panel such that the adhesive bonds the rear face of the first fiber cement panel to the front face of the second fiber cement panel.

10. The method of claim 9, wherein the method further comprises applying moisture to surfaces of at least one of the fiber cement component workpieces prior to applying the adhesive.

11. The method of claim 1, further comprising removing at least a portion of the first or second fiber cement panel.

12. The method of claim 1, wherein producing the first and second fiber cement panels comprises:
forming a substantially planar sheet of fiber cement; and
cutting the first and second fiber cement panels out of the substantially planar sheet of fiber cement.

13. The method of claim 1, wherein the fiber cement articles comprises at least one of an exterior cladding article, an interior cladding article, a decking article, or a flooring article.

14. The method of claim 1, wherein the first fiber cement panel comprises a pigment dispersed throughout the first fiber cement panel.

15. The method of claim 14, wherein the second fiber cement panel does not comprise the pigment, and wherein the second fiber cement panel is not visible in an installed configuration of the fiber cement article.

16. The method of claim 12, further comprising applying a coating layer to the substantially planar sheet of fiber cement prior to cutting the first and second fiber cement panels out of the substantially planar sheet of fiber cement.

17. The method of claim 12, further comprising applying a coating layer to the substantially planar sheet of fiber cement after cutting the first and second fiber cement panels out of the substantially planar sheet of fiber cement.

18. The method of claim 1, further comprising applying a coating layer to the first and second fiber cement panels prior to joining the first fiber cement panel to the second fiber cement panel.

19. The method of claim 1, further comprising placing an insulation element within a space between the second fiber cement panel and the third fiber cement panel.

20. The method of claim 19, wherein the insulation element abuts the second fiber cement panel and the third fiber cement panel.

* * * * *